Sept. 6, 1949.                D. C. SOPER                 2,481,168
              FIRE EXTINGUISHER FOR MOTION-PICTURE PROJECTORS
                         Filed Dec. 18, 1945

Inventor
Donald C. Soper
By Lyon & Lyon
Attorneys

Patented Sept. 6, 1949

2,481,168

UNITED STATES PATENT OFFICE 2,481,168

FIRE EXTINGUISHER FOR MOTION-PICTURE PROJECTORS

Donald C. Soper, Los Angeles, Calif.

Application December 18, 1945, Serial No. 635,699

1 Claim. (Cl. 169—2)

My invention relates to fire extinguishers for motion picture projectors, and among the objects of my invention are:

First: To provide a fire extinguisher for motion picture projectors which is automatic in operation, and operates with extreme rapidity so that only a minimum amount of film is damaged, and which, when operated, in no manner damages the projector.

Second: To provide an automatic fire extinguisher for motion picture projectors which is easily installed, by substituting a special housing for the conventional mounting which supports the upper reel cage of the projector.

Third: To provide a fire extinguisher for motion picture projectors which does not in any way interfere with the normal operation of the projector.

With the foregoing and other objects in view, as may appear hereinafter, reference is directed to the accompanying drawings in which.

Figure 1:
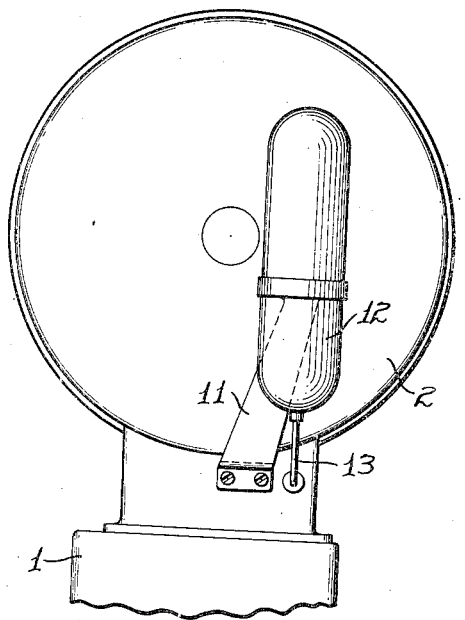
Fig. 1 is a fragmentary, substantially diagrammatical side view of a motion picture projector incorporating my automatic fire extinguisher.
Figure 2:
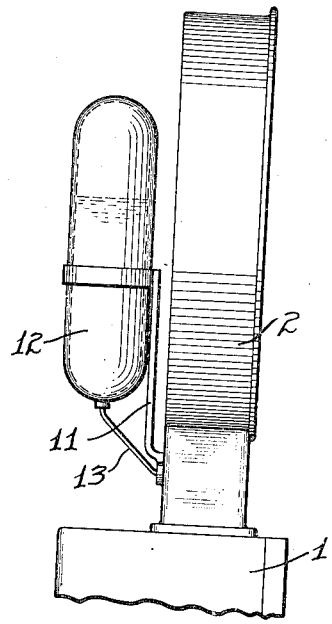
Fig. 2 is a similar fragmentary front view thereof.
Figure 4:
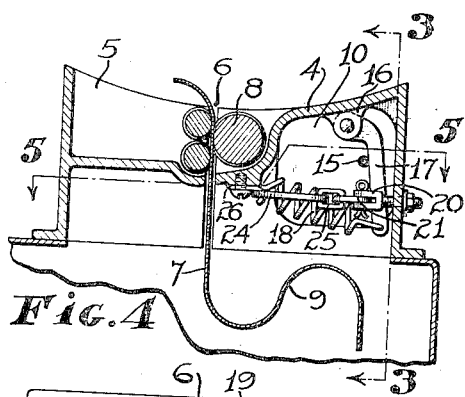
Fig. 4 is an enlarged, longitudinal sectional view of my fire extinguisher taken through 4—4 of Fig. 3.
Figure 3:
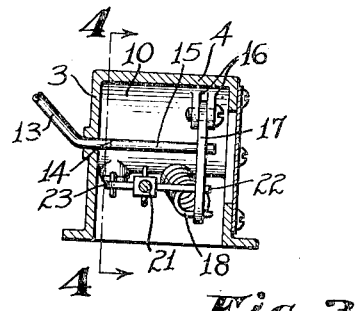
Fig. 3 is an enlarged, transverse sectional view of my fire extinguisher taken through 3—3 of Fig. 4.
Figure 5:
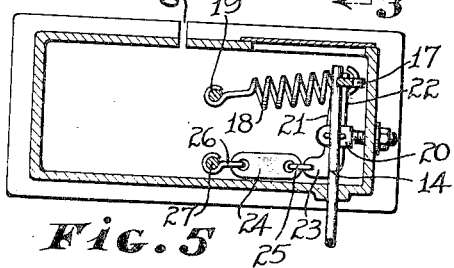
Fig. 5 is a sectional view thereof taken substantially along the line 5—5 of Fig. 4 looking downwardly.

My automatic fire extinguisher is adapted for use on any of the conventional motion picture projectors. In the drawings the projector is shown substantially diagrammatically. The conventional projector includes a main projector housing through which the motion picture film is moved and across which is projected the intense light necessary to project the images carried on the film. If the film moves in its intended manner, the film does not remain long enough in the projector housing to be dangerously heated. If, however, a film should break or the mechanism jam, film may pile up in the housing, and unless the light source is immediately cut off, there is danger of fire. My apparatus is particularly designed to prevent this occurrence.

In the drawings a projector housing is represented diagrammatically and fragmentarily. Normally, the projector housing supports, by a suitable base structure, an upper reel cage 2. The conventional base structure is removed from the projector, and a fire extinguisher housing 3, constituting a part of my device, is substituted. The outer dimensions of the fire extinguisher housing 3 are preferably the same as the base structure it displaces.

Within the fire extinguisher housing 3 is a partition 4, a portion of which follows the upper side of the housing, and a portion of which is depressed as indicated by 5. The housing is provided with a lateral slot 6 which permits insertion of a motion picture film 7. Within the depressed portion 5 are suitable rollers 8 for engaging the film 7 and guiding the film from the reel, not shown, contained in the upper reel cage. In the conventional projector, the motion picture film is formed into a loop 9 to provide for sufficient slack and permit intermittent movement through the projector. This loop 9 is located under a cavity 10 defined by the undepressed portion of the partition 4 and the corresponding sides and end of the housing 3.

Mounted on the outside of the fire extinguisher housing 3, or mounted on the projector housing 1, whichever is more convenient, is a bracket 11 which extends upwardly along the side of the upper reel cage and supports a fire extinguisher cartridge 12. The cartridge 12 is in the form of a cylinder rounded at its ends and capable of withstanding a substantial internal pressure. The cartridge is partially filled with a fire extinguishing liquid, such as carbon tetrachloride, and is pressurized by carbon dioxide gas. The cartridge has preferably only one inlet in the form of a small diametered tube 13 through which the cartridge is both charged and discharged. The tube 13 extends downwardly from the cartridge and through an opening in the corresponding side wall of the fire extinguisher housing 3. This opening is preferably just large enough to provide a sliding fit. The discharge tube projects laterally across the fire extinguisher cartridge and is provided with a scored or weakened portion 14 adjacent its point of entry, so that it forms an extended tip 15 sealed at its extremity but adapted to be broken if subjected to sufficient lateral force.

Within the housing 3, and depending from the partition 4, is a pair of bosses 16 which journal a depending lever 17 adapted to engage the extended portion of the tip 15. The lower end of the lever 17 is attached to a spring 18 which is anchored to the depressed portion 5 of the partition 4 by means of an anchor screw 19, The spring 18 has sufficient strength to pull the lever 17 against the tip 15 and break the discharge tube 13 at its scored point 14.

A fulcrum pin 20 extends through the end wall of the housing 3 and is provided within the housing with a yoke which fulcrums a latch lever 21 intermediate its ends. One arm 22 of the latch lever engages the lever 17 to restrain the spring 18, whereas the other arm at 23 is attached by means of a fuse 24 and links 25 and 26 to an anchor screw 27 secured in the depressed portion 5 of the partition 4.

Operation of the fire extinguisher is as follows:

It will be noted that the fuse 24 is located over the space defined by the edge of the film loop 9 and adjacent the side of the housing 3. This is important for the reason that upon ignition of the film the flame first passes upwardly around the edges of the film, and the fuse is, therefore, in the path of the initial flame.

When the fuse melts, the latch lever 21 is released which in turn releases the lever 17 allowing the spring 18 to snap the lever 17 against the tip 15 breaking the discharge tube 13 and allowing the contents of the cartridge 12 to discharge into the housing 3 and descend over and smother the flame in the projector.

To reload and reset the extinguisher, it is merely necessary to loosen the fulcrum pin 20. It should be noted that the stem of the fulcrum pin is threaded and provided with a nut, so that it may be moved inwardly. With the fulcrum pin in an inner position, a new fuse is hooked between the arm 23 and the anchor screw 27, and the latching arm 22 is brought into proper engagement with the lever 17. The fulcrum pin 20 is then tightened until the lever 17 is drawn clear of the position to be occupied by the discharge tube tip 15. A new fire extinguisher cartridge is then secured in the bracket 11 and its discharge tube 13 extended into the fire extinguishing housing 3.

Many other embodiments of the invention may be resorted to without departing from the spirit of the invention.

I claim:

An automatic fire extinguisher for motion picture projectors, comprising: a pressurized fire extinguisher cartridge secured to a motion picture projector and including a fluid pressure resistant frangible stem penetrating into a region of the projector subject to fire hazard; a lever arm pivotally mounted in said region and traversing said stem; a spring urging said lever in a direction to engage and break said stem thereby to discharge the contents of said cartridge into said region; a fulcrum element including a shank extending through a wall defining said region; a latch lever journalled intermediate its ends on said fulcrum element; a fuse link anchored at one end and connected by its other end to an end of said latch lever, the remaining end of said latch lever engageable with said lever arm to restrain said spring, said fulcrum element being adjustable by means of said shank to relieve and apply tension to said fuse element and spring.

DONALD C. SOPER.

REFERENCES CITED

The following references are of record in the file of this patent:

UNITED STATES PATENTS

| Number | Name | Date |
| --- | --- | --- |
| 1,696,800 | Helm | Dec. 25, 1928 |
| 1,846,128 | Mac Gregor | Feb. 23, 1932 |
| 1,972,437 | Blum | Sept. 4, 1934 |
| 2,002,308 | Burchfield | May 21, 1935 |